United States Patent Office 2,782,139
Patented Feb. 19, 1957

2,782,139
REINFORCED RUBBER ARTICLES

Rutherford B. Hill, St. Albans, and Harry W. Kilbourne, South Charleston, W. Va., assignors to Monsanto Chemical Company, St. Louis, Mo., a corporation of Delaware No Drawing. Application June 16, 1954,
Serial No. 437,306

12 Claims. (Cl. 154—52)

This invention relates to the treatment of fibers. More particularly it relates to a method of obtaining improved adhesion or bonding between rubber and fibers either in the form of yarn, cord, fabric or filaments, and to the products obtained thereby. This invention is particularly applicable to the improvement in adhesion between rubber and synthetic fibers.

An object of the invention is to improve the bonding of fibers to rubber. A particular object is to provide a chemical treatment for commercial rayon or nylon or other synthetic fibers for the purpose of increasing the adhesion to natural or synthetic rubber in reinforced rubber products. Other objects are to provide a method of treating fibers to increase their adhesion to rubber and to provide vulcanized fiber reinforced rubber articles characterized by a fiber-rubber bond of increased strength. Still further objects will be apparent from the description following.

The poor adhesion of textile fibers, fabrics, and the like to rubber has constituted a serious obstacle in the manufacture of laminated rubber articles such as automobile tires, belts and hose. Textile fibers, especially synthetic fibers like rayon cord, do not adhere strongly to vulcanizable rubber stocks when the two are united and the rubber subsequently vulcanized. On the other hand, cords of regenerated cellulose and other synthetic fibers such as nylon are desirable because of tensile strengths and heat resistance properties superior to natural fibers. Therefore, there has been considerable demand for satisfactory agents to improve the adhesion between the cord or fabric and the rubber.

In accordance with this invention it has been found that treating a fiber with a mercapto thiazole carboxylic acid increases the adhesion to a rubber. These compounds are characterized by the presence of both a carboxyl group and a mercapto group linked to a thiazole ring although it is noteworthy that neither group necessarily need be present as such. Good results have been obtained with various derivatives, as for example cadmium or amine salts. Simiularly, compounds having the carboxyl group esterified with a short chain alcohol of one to four carbon atoms may be used although the adhesion is less than with the parent compound.

In order to set forth clearly and concisely the principles of the invention it will be described with particular reference to rayon and nylon cord. However, it is to be understood that other fibers may be substituted.

The objects of the invention are accomplished in general by applying to a cord in any suitable manner the mercapto thiazole carboxylic acid or derivative. This may be accomplished by use of an aqueous solution or dispersion, or solution or dispersion in organic solvents, or in emulsion, or by adding the adhesion promoting substance to viscose dope before forming into filaments. The treated cord is then embedded in a rubber compound and subsequently vulcanized to form a reinforced rubber article having improved properties. The rubber compound will of course contain the usual vulcanizing agents, accelerators, stabilizers, fillers and the like. In its preferred and common form the invention contemplates any compounded rubber stock, natural or synthetic, such as commonly employed in the fabrication of automobile tires, hose, raincoat materials, shoes, beltings such as conveyor belts, fan belts, driving belts, and the like.

In an example of the invention, rayon tire cord (1100/490/2) suitable for use in the manufacture of automobile tires was treated with a 2.5% solution of 2-mercapto-4-methyl-5-thiazole carboxylic acid in acetone. The cord was led into the solution by passing it under an aluminum reel dipping in a body of the solution contained in an aluminum container. After the cord was pulled through the treating bath it was air dried. After leaving the bath the cord may be squeegeed but it was found in practice that this step is not essential. Furthermore, drying at elevated temperature, as for example under a bank of infrared lamps, is feasible if desired.

A natural rubber gum matrix was compounded comprising—

Base A: Parts by weight
    Smoked sheets _____ 100.0
    Zinc oxide _____ 5.0
    Stearic acid _____ 1.0
    Sulfur _____ 2.5
    2,2'-dithiobis benzothiazole _____ 0.75
    Saturated hydrocarbon softener _____ 3.0

This composition was sheeted from a rubber mill at 0.052" and rolled onto square woven cotton duck backing cloth of a thickness 0.014" to 0.015" to give a total gauge of approximately 0.065". The treated cord was then placed between strips of the rubber coated fabric backing cloth and the assembly placed in a modified Armstrong mold. The plates were 11½" x 12⅝" and the rubber strip channels ⅜" wide by 0.100" deep and separated by ¼". 16 cord slots were separated from one another by 1" on their centers. Further details of the Armstrong mold are described in India Rubber World, May 1946, pages 213–219. The contents in the mold were cured by heating for 30 minutes at 142° C. From the cured slabs H shaped specimens were cut and the adhesion of the cord to rubber determined. Essentially the H test is a measurement of the force required to pull a single cord in the direction of its axis from a strip of rubber in which one length of the cord of a given length is embedded. Thus, the quantity measured is the pounds shearing force acting across the cord to rubber interface. Set forth below are the results of three independent determinations comparing the treated to the untreated cord.

Table I

| Adhesion, Pounds | | Percent Increase |
|---|---|---|
| Untreated | Treated | |
| 5.6 | 9.5 | 70 |
| 4.2 | 7.2 | 73 |
| 4.2 | 7.2 | 73 |

Similar determinations were carried out employing the same rayon cord and the same treating bath but embedding the cord in a natural rubber-carbon black stock comprising—

Base B: Parts by weight
    Smoked sheets _____ 100.
    Stearic acid _____ 1.
    Zinc oxide _____ 5.
    Sulfur _____ 2.5
    2,2'-dithiobis benzothiazole _____ 0.7
    Saturated hydrocarbon softener _____ 3.0
    Carbon black _____ 25.0

The results set forth below are the average of two determinations:

Table II

| Adhesion, Pounds | | Percent Increase |
|---|---|---|
| Untreated | Treated | |
| 5.8 | 9.1 | 58 |

In another application employing the natural rubber-carbon black matrix, 2-mercapto-4-methyl-5-thiazole carboxylic acid was applied as a 10% water dispersion containing 3% casein as dispersing agent. The improvement in adhesion was comparable to that obtained by application in acetone solution:

Table III

| Adhesion, Pounds | | Percent Increase |
|---|---|---|
| Untreated | Treated | |
| 4.8 | 7.8 | 63 |

The adhesion to synthetic rubber of cord treated in accordance with this invention is even greater than in the case of natural rubber. Tests were carried out with butadiene-styrene copolymer rubber matrix comprising—

Base C: Parts by weight
GR-S 1500 _____ 100.0
Zinc oxide _____ 5.0
Sulfur _____ 3.0
2,2'dithiobis benzothiazole _____ 1.5
Saturated hydrocarbon softener _____ 7.5
Carbon black _____ 25.0

The cord was treated by pulling through a 2.5% or 5.0% solution in acetone of a thiazole carboxylic acid and the rubber cord assembly cured by heating for 15 minutes at 158° C. The adhesion values set forth below are the averages of nine independent determinations:

Table IV

| Conc. of Acetone Soln., Percent | Active Ingredient | Adhesion, Pounds | | Percent Increase |
|---|---|---|---|---|
| | | Untreated | Treated | |
| 2.5 | 2-Mercapto-4-methyl-5-thiazole carboxylic acid. | 7.7 | 14.0 | 82 |
| 5.0 | ___do___ | 6.3 | 12.5 | 98 |
| 5.0 | 2-Mercapto-4-thiazole acetic acid. | 6.3 | 11.3 | 79 |
| 10.0 [1] | 2,2'-Dithiobis (4-thiazoleacetic acid). | 8.0 | 10.7 | 33 |
| 10.0 [1] | 2,2'-Dithiobis (4-methyl-5-thiazole carboxylic acid). | 8.0 | 12.0 | 50 |

[1] Aqueous dispersion.

2-mercapto-4-thiazole acetic acid may be obtained by alkaline hydrolysis of ethyl 2-mercapto-4-thiazoleacetate which latter is obtained by condensing ethyl gamma chloroacetoacetate and ammonium dithiocarbamate in aqueous medium. Oxidation of 2-mercapto-4-thiazole acetic acid with ammonium persulfate yields 2,2'-dithiobis (4-thiazole acetic acid). These reactions are described in co-pending application of John J. D'Amico, Serial No. 384,328, filed October 5, 1953. Preparation of 2,2'-dithiobis(4-methyl-5-thiazole carboxylic acid) by oxidation of 2-mercapto-4-methyl-5-thiazole carboxylic acid with ammonium persulfate is described in co-pending application of John J. D'Amico, Serial No. 343,508, filed March 19, 1953, now Patent No. 2,746,970.

In the series of tests described below the amount of 2-mercapto-4-methyl 5-thiazole carboxylic acid adhering to the cord was determined by weighing the cord before and after treatment. The amount of pickup was varied by using 1%, 2.5%, 5% and 10% acetone solutions as the treating bath. The adhesion of the treated and untreated cords employing rubber Base C together with the percent pickup of the adhesive are set forth below:

Table V

| Adhesion, Pounds | | Percent Pickup | Percent Increase |
|---|---|---|---|
| Untreated | Treated | | |
| 7.3 | 9.6 | 0.4 | 31 |
| 7.3 | 11.6 | 2.6 | 59 |
| 8.4 | 13.4 | 2.9 | 60 |
| 6.3 | 14.2 | 8.5 | 109 |

Tests were carried out with salts and other derivatives of 2-mercapto-4-methyl-5-thiazole carboxylic acid. The ethyl ester refers to the compound having the carboxyl group replaced by a carboethoxy group. These tests were run by dipping the cord in acetone containing 2.5% of the derivative and embedding the treated cord in the natural rubber-carbon black Base B and in the GR-S-black Base C. The adhesion values of the treated as compared to the untreated cord are set forth below:

Table VI

| Base Stock | Derivative | Adhesion, Pounds | | Percent Increase in Adhesion |
|---|---|---|---|---|
| | | Untreated | Treated | |
| B | Diphenyl guanidine salt | 5.9 | 8.2 | 39 |
| B | Cadmium salt | 5.5 | 7.2 | 30 |
| B | Di diisopropylamine salt | 5.9 | 9.3 | 57 |
| C | Cadmium salt | 9.2 | 11.7 | 21 |
| C | Triethanolamine salt | 6.8 | 9.8 | 44 |
| C | Ethyl ester | 9.7 | 11.6 | 20 |

As exemplary of the results with other fibers nylon tire cord was dipped onto a 2.5% acetone solution of 2-mercapto-4-methyl-5-thiazole carboxylic acid. A rubber matrix containing the treated cord was vulcanized and the adhesion values obtained as hereinbefore described. The following table summarizes the results obtained:

Table VII

| Base Stock | Adhesion, Pounds | | Percent Increase |
|---|---|---|---|
| | Untreated | Treated | |
| B | 6.7 | 11.0 | 65 |
| C | 7.8 | 23.0 | 195 |

Some of the adjuvants of the present invention are new chemical compounds, as for example 2-mercapto-4-thiazole acetic acid. The preparation of this compound is described in co-pending application of John J. D'Amico, Serial No. 384,328, filed October 5, 1953. While best results have been obtained with thiazoles containing a carboxyl group, significant improvements from treatment with ester derivatives have already been noted. As exemplary of results with other esters, rayon tire cord was treated with 2.5% acetone solutions of the compounds shown in Table VIII. The preparation of these compounds also is described in co-pending application Serial No. 384,328. Using the natural rubber gum stock, Base A, and GR-S Base C, the percentage increase in adhesion as compared to the untreated controls was determined all as hereinbefore described.

Table VIII

| Test Material | Percent increase in Adhesion | |
|---|---|---|
| | Base A | Base C |
| Ethyl 2-mercapto-4-thiazoleacetate | 22 | 17 |
| Ethyl 2-(3-chloro-2-butenylmercapto)-4-thiazoleacetate | 39 | 46 |

Bonding action is exhibited by products obtained by reacting a mercapto thiazole carboxylic acid with formaldehyde or with formaldehyde and urea or thiourea. The corresponding derivatives of mercaptobenzothiazole are well known (U. S. Patent 1,960,197 to Zimmerman and U. S. Patent 2,145,808 to Sibley). Also suitable are sulfenamide derivatives of the mercapto thiazole carboxylic acids, as for example 4-methyl-2(4-morpholinylsulfenyl)-5-thiazole carboxylic acid, the preparation of which is described in co-pending application of John J. D'Amico, Serial No. 380,873, filed September 17, 1953. Still further mercapto thiazole carboxylic acids applicable to the process of the invention comprise compounds of the following structure:

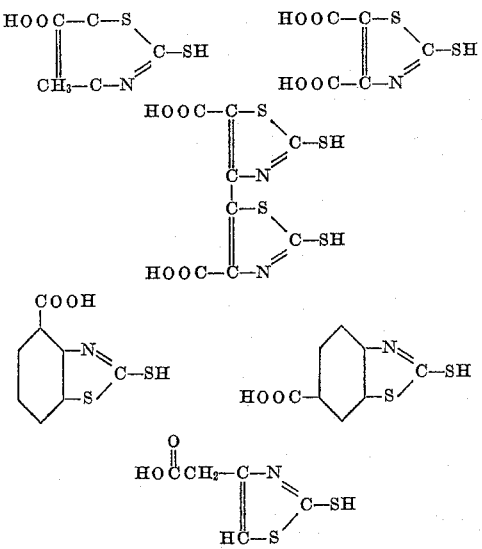

It is intended to cover all changes and modifications of the examples of the invention herein chosen for purposes of disclosure which do not constitute departures from the spirit and scope of the invention.

What is claimed is:

1. The method of treating fiber to enhance its adhesion to rubber which comprises impregnating the fiber with a compound containing a meta thiazole nucleus containing sulfur linked in the 2-position and having attached to at least one of the carbon atoms in the thiazole ring a substituent which contains a radical selected from the group consisting of carboxy and carboalkoxy radicals.

2. The method of treating fiber to enhance its adhesion to rubber which comprises impregnating the fiber with a mercapto thiazole carboxylic acid containing the mercapto group in the 2-position of a meta-thiazole nucleus and having the carboxyl group attached to one of the carbon atoms.

3. The method of treating fiber to enhance its adhesion to rubber which comprises impregnating the fiber with 2-mercapto-4-methyl-5-thiazole carboxylic acid.

4. The method of treating rayon tire cord to enhance its adhesion to rubber which comprises impregnating the rayon cord with 2-mercapto-4-methyl-5-thiazole carboxylic acid.

5. The method of treating nylon tire cord to enhance its adhesion to rubber which comprises impregnating the nylon cord with 2-mercapto-4-methyl-5-thiazole carboxylic acid.

6. The method of treating rayon tire cord to enhance its adhesion to rubber which comprises impregnating the rayon cord with 2-mercapto-4-thiazole acetic acid.

7. Vulcanized fiber reinforced rubber articles, said fiber being adhered to the vulcanized rubber by means of a compound containing a meta thiazole nucleus containing sulfur linked in the 2-position and having attached to at least one of the carbon atoms in the thiazole ring a substituent which contains a radical selected from the group consisting of carboxy and carboalkoxy radicals.

8. Vulcanized fiber reinforced rubber articles, said fiber being adhered to the vulcanized rubber by means of a mercapto thiazole carboxylic acid containing the mercapto group in the 2-position of a meta-thiazole nucleus and having the carboxyl group attached to one of the carbon atoms.

9. Vulcanized fiber reinforced rubber articles, said fiber being adhered to the vulcanized rubber by means of 2-mercapto-4-methyl-5-thiazole carboxylic acid.

10. A vulcanized rubber-rayon cord composite article, said rayon cord being adhered to the vulcanized rubber of the said composite article by means of 2-mercapto-4-methyl-5-thiazole carboxylic acid.

11. A vulcanized rubber-nylon cord composite article, said nylon cord being adhered to the vulcanized rubber of the said composite article by means of 2-mercapto-4-methyl-5-thiazole carboxylic acid.

12. A vulcanized rubber-rayon cord composite article, said rayon cord being adhered to the vulcanized rubber of the said composite article by means of 2-mercapto-4-thiazole acetic acid.

References Cited in the file of this patent
UNITED STATES PATENTS

| Re. 23,451 | Mighton | Jan. 15, 1952 |
| 2,338,177 | Graenacher et al. | Jan. 4, 1944 |
| 2,499,774 | Perkerson | Mar. 7, 1950 |